United States Patent Office 2,802,124
Patented Aug. 6, 1957

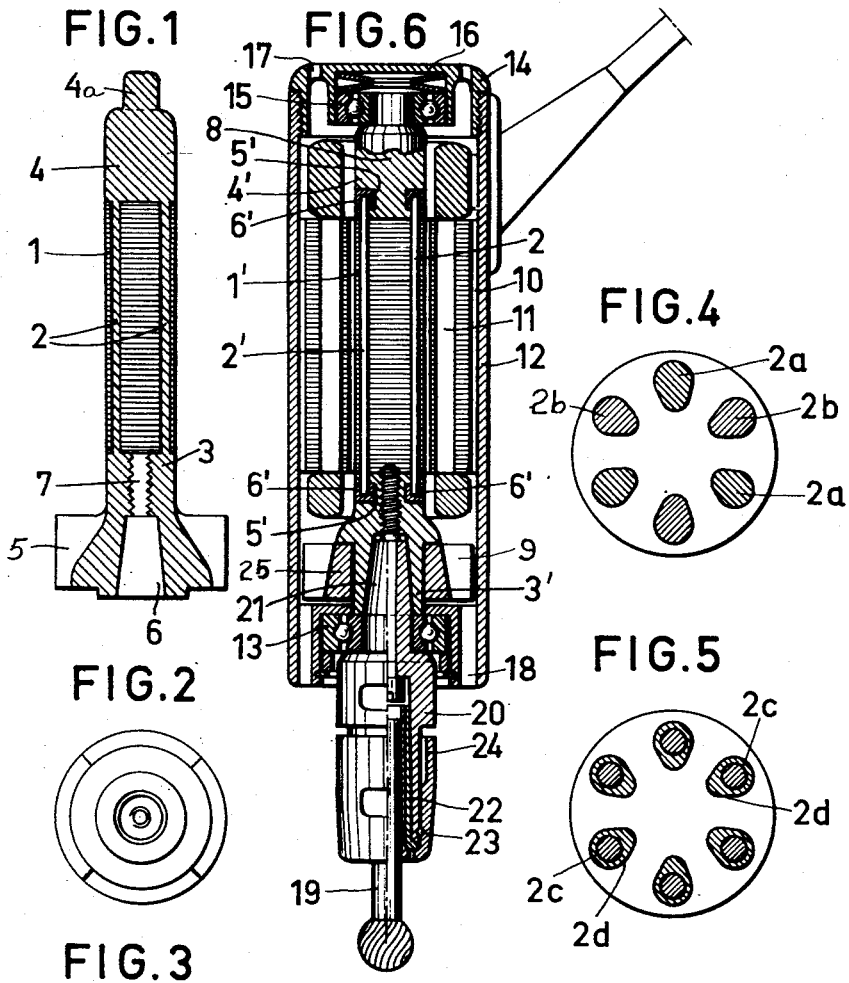
BERYLLIUM COPPER ALLOY HARDENED AND GIVEN INITIAL STRESS IN ORDER TO HOLD THE LAMINATED CORE TOGETHER WITH FORCE
ALLOY: 98.2% Cu 0.3% Be 1.5% Ni OR
97.75% Cu 1.95% Be 0.3% Co
Anders Sjöblom
INVENTOR
By Pierce, Scheffler & Parker
Attorneys

2,802,124

HIGH SPEED SHORT-CIRCUITED ROTOR

Anders Sjöblom, Eskilstuna, Sweden, assignor to C. O. Oberg & Co:S AB, Eskilstuna, Sweden Application February 28, 1955, Serial No. 491,137

Claims priority, application Sweden May 15, 1954

11 Claims. (Cl. 310—211)

This invention relates to small rotating electric machines with short-circuited rotor, for example asynchronous motors, preferably for rapidly rotating hand tools, such as rotating files, burrs, and the like, and also for electric instruments, for example gyroscopes. The object of the invention is above all to provide a small motor with a high rotative speed, a great starting torque, and as light as possible. The motors hitherto known do not fulfill these demands. This applies above all to direct current or alternating current motors provided with commutator, which all must have a rotor wound with a relatively thin wire. Even with a rotor baked into Bakelite the running reliability is unsatisfactory and the weight of the machine per unit of powder is too high. With regard to the high velocities which are concerned in this case machines driven by pneumatic air have proved to be sufficiently powerful, light and durable. However, they are several times more expensive to operate than electric machines owing to their great consumption of air, and besides they suffer from the disadvantage that the rotative speed changes too much when the load differs. Three-phase motors of rapid frequency type (rapid frequency: 100—about 2000 per second) with a short-circuited rotor having hitherto proved to be the most suitable, for example for rotating files of hard metal. With regard to rotating files, however, the peripheral velocity ought to be kept at about the same rate as for a grinding pin of the same diameter, that is, 20–30 metres per second, as at such a peripheral velocity the cutting ability and the length of life of the file and the grinding disc will be as great as possible. In order to obtain this peripheral velocity a file, for example of a diameter of 6 mms. ought to rotate 60,000–100,000 or 150,000 revolutions per minute. In order to make the rotor sufficiently rigid at such a high number of revolutions, the shaft must be rather large-sized, which implies that the space for the magnetic lines of force in the sheet-iron core will be too small, if the rotor has so small a diameter (that of the rotor about 8–15 mms. and that of the whole motor about 20–40 mms.) that is desired for the purpose intended.

The object of this invention is to eliminate these disadvantages, the invention being substantially characterized thereby that the shaft pins of the rotor are attached to the rotor conductors, that the space between these conducors is occupied by a core conducting the magnetic flux, for example a laminated core or an iron powder core and that the rotor conductors, in the form of bars, subsequent to attachment to end pieces which serve as short-circuiting means for the conductor ends and which also serve as shaft pins, and assembly with the core material, are heated treated. The heat treatment hardens the rotor conductors and, what is more important, causes them to contract upon cooling, thus establishing a permanent longitudinal stress therein which not only serves to maintain the core body under a high degree of compression and thereby improve the flux flow but also establishes a correspondingly high degree of resistance to bending forces imposed upon the rotor when rotating at high speeds. Thus, long rotors having a relatively small diameter as compared to their length can be rotated at very high speeds without danger of bending about their longitudinal axis. Since the space between the conductors all the way to the longitudinal axis of the rotor body is occupied by magnetic core material, the magnetic lines of force will form a continuous magnetic field straight therough the rotor, a great flux and a great torque being thereby obtained. The motor made in accordance with the invention fulfills thereby satisfactorily the demands made on an electric motor for driving rotary hand tools. It can practically be as small as desired and the good properties remain both with regard to rapidity, great starting torque, great torque at decreased speed etc. It may even be so small that it can be used by a dentist and need not have greater diameter than a pencil. If burrs of hard metal are used, dentist-work can be carried out nearly painlessly, owing to the high velocity of the motor made in accordance with the invention, as the friction heat is practically entirely removed with the material particles ground off.

In order to make the motor sufficiently strong its length is preferably made several times greater than the diameter, and owing to the high slip frequency (for example 50–100 periods per minute) a laminated core is preferably used. Such a core of assembled sheets must be stabilized by suitable means, for example bars going therethrough, which may form the conductors of the rotor. They ought to be made of a material of suitable mechanical strength and durability. Tests made with different kinds of material have shown that the copper alloys with one or a few percent of beryllium are particularly suitable, for example 98.2% Cu, 0.3% Be, 1.5% Ni, or 97.75% Cu, 1.95 Be, and 0.3% Co. They can be hardened through heat treatment after having been mounted in the rotor, a hardness of about 300 Brinell being then obtained, and they are extraordinarily resistant against repetition of stress. Due to the fact that the conductors are contracted when cooled from hardening temperature the sheet-iron core will form an extremely compact mass, particularly if the sheets have been planed through grinding, a process which in itself contributes to improving the quality of the sheet-iron owing to the fact that the surface layer of the sheet-iron, which always suffer heavier hysteresis losses than the interior of the sheet-iron, is removed. In this case a thin insulation film or oxidation film must be applied on the sheets after the grinding. If the rotor is to be given the highest quality with regard to resistance to mechanical and electrical stresses, the two end pieces ought to be made with accuracy from non-magnetic steel. The beryllium bronze bars are made of drawn and straightened material, since die casting always implies a risk of porosity with resultant impairment of the material and higher electric resistance in some of the bars or all of them. The rotor bars are inserted into holes in the end pieces and are afterwards soldered together with bronze at the ends, in a groove cut in each end piece, so that a short-circuiting ring is formed therein. Thereafter the rotor is exposed to heat treatment (aged), whereby the beryllium bronze forming the rigid conductor bars is hardened and contracts thus establishing longitudinal and permanent stresses in these bars which is reflected by compression of the sheet-iron core of the rotor with great force so that a compact mass is formed. Finally the rotor is precision ground to exact dimensions and is balanced in a balancing machine and is race tested with a suitable number of revolutions. (75,000–200,000 revolutions per minute).

Instead of making the conductors of beryllium copper it is possible to make certain of them of a material with good conductivity for example electrolyte copper, and the rest of them of a material with great strength, such as steel, for example stainless steel, or both steel and copper bars may be placed in the same longitudinal passageways through the body of the rotor, steel bars being inserted in a sufficient number of passageways that the mechanical properties of the rotor become satisfactory.

Embodiments of the invention are shown in the accompanying drawing.

Fig. 1 shows a longitudinal section of the rotor.

Fig. 2 shows an end view of the rotor.

Fig. 3 shows on a larger scale a transverse section of the rotor through the iron core.

Figs. 4 and 5 are views similar to Fig. 3 showing somewhat modified constructions.

Fig. 6 shows a longitudinal section through an electrical hand tool provided with a rotor according to a further embodiment.

In the example shown in Fig. 1 the reference numeral 1 designates the iron core. It may either be in the form of a pile of circular plates with holes punched out for the conductors, or it may be made in such a manner that a mass is cast round the rotor conductors in a mould, which mass consists of synthetical resin into which a suitable quantity of iron powder has been mixed. The reference numeral 2 designates the conductors which consist of electrical conductive bars of a suitable section. The bars are short-circuited in each end by means of the members 3 and 4 respectively. The member 3 is formed with fan blades 5 and a conical bore 6 in which a shaft can be fitted and is drawn tight by means of a screw in the threaded bore 7. The member 4 is formed with a bearing pin 4a. The members 2, 3, 4 and 5 are so formed that they can advantageously be made in one step, for example by casting (die casting).

According to Fig. 3 the conductors 2 are made with drop-shaped profile in order to give the conductor bars as great an area as possible while at the same time as great an area as possible for the magnetic flux is maintined in the iron.

In Fig. 6 there is shown a longitudinal section through a complete electrical hand tool of variable velocity and provided with a motor in accordance with the invention, preferably a double-poled 3-phase motor which is provided with a chuck for retaining the tool and is driven by single-phase or preferably multiphase alternating current of variable frequency which can be generated by a motor converter which can be connected directly to a single phase alternating-current main, said motor converter consisting of a rectifying member with a smoothing member, a commutating member and transformer.

The reference numeral 8 is the short-circuited rotor with a fan 9. The reference numeral 10 designates the stator plates and 11 the stator winding. The casing of the motor is designated by 12, said casing being at one end formed for receiving the ball bearing 13 and at the other end so as to carry the ball bearing 15 by means of the end cap 14. A spring washer 16 presses by means of the ball bearing 15 the rotor 8 forwards against the ball bearing 13 in order to eliminate play. The fan 9 sucks air through the motor whereby cool air flows in through the holes 17 and is blown out through the holes 18.

The tool 19 (a file in the example shown) is retained to the rotor 8 by means of a chuck consisting of a body 20 with a conical pin 21 and collet 22, spring ring 23, and a cap nut 24. The function of the spring ring 23 is to pull out the collet 22, when the tool 19 is to be loosened. In order to make the tool as short as possible and thus the bending moment from the tool as little as possible the cone 21 has been positioned inside the ball bearing 13 in the motor of the tool, whereby the rotor will be carried by the ball bearing 13 by means of the pin of the chuck body 20.

The reference numeral 1' designates the sheet-iron core the length of which is several times greater than the diameter, 2' designates the conductors, 3' and 4' the end pieces which are preferably made of steel. The reference numeral 25 designates a ring shrunk on and provided with the fan vanes 9. In the end pieces 3' and 4' there are provided grooves 5' going round the end pieces, and the conductor bars 2' are introduced into axial slots in the end pieces 3' and 4', so that they intrude with their ends into the grooves 5', after which they are soldered to the end pieces in the said grooves. The soldering material, for example bronze, thus forms short-circuiting rings 6'. The said holes for the bars 2' may also be open at the periphery of the end pieces 3' and 4'. The bars may be of beryllium copper as indicated in Fig. 3 or the arrangement may be as illustrated in Fig. 4 wherein some of the bars 2a may be of copper and other bars 2b of a material with a high yield limit, such as steel. A further arrangement is shown in Fig. 5 wherein each of the holes contains bars of copper and steel, the copper bars 2d surrounding inner bars 2c of steel, the bar configuration as a whole being of drop form as in Figs. 3 and 4.

The embodiments shown and described are intended as examples, many modifications being possible within the scope of the invention.

Having now described my invention what I claim as new and desire to secure by Letters Patent is:

1. An asynchronous motor, whose rotor core has a length several times as great as its diameter, characterized in that the shaft ends of the rotor at both ends of the rotor are attached to the rotor conductors, the said conductors being provided with permanent longitudinal stress, and in that the whole space between said conductors is occupied to the rotor center by a core conducting the magnetic flux.

2. An asynchronous motor as defined in claim 1 wherein the said permanent longitudinal stress in said rotor conductors is established by hardening of said conductors subsequent to assembly with said core and shaft ends.

3. An asynchronous motor as defined in claim 1 wherein said core is constituted by laminations bonded together by an adhesive material such as a synthetic resin.

4. An asynchronous motor as defined in claim 3 wherein the surfaces of said laminations are ground off and provided with an electrically insulating film prior to assembly to form said core.

5. An asynchronous motor as defined in claim 1 wherein said rotor conductors are formed from beryllium copper.

6. An asynchronous motor as defined in claim 1 wherein said rotor conductors are made from an alloy having the composition 98.2% Cu., 0.3% Be and 1.5% Ni.

7. An asynchronous motor as defined in claim 1 wherein said rotor conductors are made from an alloy having the composition 97.75% Cu, 1.95% Be and 0.3% Co.

8. An asynchronous motor as defined in claim 1 wherein some of said rotor conductors are formed from a material having a high yield limit such as for example steel and some of said rotor conductors are formed from a material having a good electrical conductivity such as electrolyte copper.

9. An asynchronous motor as defined in claim 8 wherein those rotor conductors having a high yield limit and those rotor conductors having a good electrical conductivity are disposed in different longitudinal passageways through said rotor.

10. An asynchronous motor as defined in claim 8 wherein those rotor conductors having a high yield limit and those rotor conductors having a good electrical conductivity are disposed in the same longitudinal passageways through said rotor.

11. An asynchronous motor as defined in claim 1 wherein each shaft end is provided with longitudinal slots in which are placed the ends of said rotor conductors, the ends of said rotor conductors being electrically connected by a conductive ring disposed in a groove in said shaft end intersecting said slots.

References Cited in the file of this patent

UNITED STATES PATENTS

| 2,141,319 | Sato | Dec. 27, 1938 |
| 2,387,073 | Horlacher | Oct. 16, 1945 |
| 2,419,863 | Ware | Apr. 29, 1947 |

FOREIGN PATENTS

| 388,100 | Great Britain | Feb. 23, 1933 |